(12) United States Patent
Ou et al.

(10) Patent No.: US 10,999,870 B2
(45) Date of Patent: May 4, 2021

(54) METHOD AND APPARATUS FOR RANDOM ACCESS CONFIGURATION IN A WIRELESS COMMUNICATION SYSTEM

(71) Applicant: ASUSTek Computer Inc., Taipei (TW)

(72) Inventors: Meng-Hui Ou, Taipei (TW); Richard Lee-Chee Kuo, Taipei (TW); Tun-Huai Shih, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/058,717

(22) Filed: Aug. 8, 2018

(65) Prior Publication Data

US 2019/0059112 A1 Feb. 21, 2019

Related U.S. Application Data

(60) Provisional application No. 62/547,373, filed on Aug. 18, 2017.

(51) Int. Cl.
| | | |
|---|---|---|
| *H04W 74/08* | (2009.01) | |
| *H04W 74/00* | (2009.01) | |
| *H04W 88/02* | (2009.01) | |

(52) U.S. Cl.
CPC ..... *H04W 74/0833* (2013.01); *H04W 74/008* (2013.01); *H04W 88/02* (2013.01)

(58) Field of Classification Search
CPC ......... H04W 74/0833; H04W 72/0453; H04W 72/02; H04W 76/27
See application file for complete search history.

(56) References Cited

U.S. PATENT DOCUMENTS

| | | | |
|---|---|---|---|
| 2010/0110994 A1 | 5/2010 | Ratsuk | |
| 2011/0013542 A1 | 1/2011 | Yu | |
| 2013/0083749 A1 | 4/2013 | Xu et al. | |
| 2013/0114537 A1* | 5/2013 | Lee | H04W 74/002 370/329 |
| 2018/0098361 A1 | 4/2018 | Ji et al. | |
| 2019/0045549 A1* | 2/2019 | Wu | H04W 36/0055 |

FOREIGN PATENT DOCUMENTS

| | | |
|---|---|---|
| CN | 101686547 | 3/2010 |
| CN | 104349476 A | 2/2015 |
| CN | 105594141 | 5/2016 |
| EP | 2214448 | 12/2009 |

(Continued)

OTHER PUBLICATIONS

Office Action from Taiwan Patent Office in corresponding TW Application No. 107127701, dated Jun. 17, 2019.

(Continued)

*Primary Examiner* — Elton Williams
(74) *Attorney, Agent, or Firm* — Cooper Legal Group, LLC

(57) ABSTRACT

A method and apparatus are disclosed from the perspective of a User Equipment (UE), wherein the UE is configured with multiple Bandwidth Parts (BWPs). In one embodiment, the method includes the UE receiving information from a network node to associate a RACH (Random Access Channel) configuration with a BWP among the multiple BWPs. The method further includes that the UE performing a RACH transmission in the BWP using the RACH configuration associated with the BWP.

24 Claims, 10 Drawing Sheets

(56) References Cited

FOREIGN PATENT DOCUMENTS

| EP | 2214448 | 8/2010 |
|----|---------|--------|
| EP | 2214448 A1 | 8/2010 |
| EP | 2552170 | 2/2011 |
| EP | 2552170 | 1/2013 |
| WO | 2016086144 | 6/2016 |
| WO | WO2017031725 | 3/2017 |
| WO | 2018053255 | 3/2018 |
| WO | WO2019030930 | 2/2019 |

OTHER PUBLICATIONS

Japanese Office Action from corresponding JP application No. 2018-148972, dated Jun. 11, 2019.
European Search Report from corresponding EP Application No. 18187939.6, dated Dec. 14, 2018.
Office Action from Taiwan Intellectual Property Office in corresponding TW Application No. 107127701, dated Jan. 29, 2019.
Office Action from SIPO in corresponding CN Application No. 201810897196.7, dated Feb. 25, 2020.
MediaTek Inc., R1-17013978, Further Details on Bandwidth Part Operation in NR, 3GPP TSG RAN WG1 #90, 3GPP Server Publication Date (Aug. 12, 2017) End.
Office Action from Korean Intellectual Property Office in corresponding KP Application No. 10-2018-0092428, dated Nov. 26, 2019.
Corresponding Indian Patent Application No. 201814029763, Office Action dated Aug. 17, 2020. English Translation.

\* cited by examiner

US 10,999,870 B2

METHOD AND APPARATUS FOR RANDOM ACCESS CONFIGURATION IN A WIRELESS COMMUNICATION SYSTEM

CROSS-REFERENCE TO RELATED APPLICATIONS

The present application claims the benefit of U.S. Provisional Patent Application Ser. No. 62/547,373 filed on Aug. 18, 2017, the entire disclosure of which is incorporated herein in their entirety by reference.

FIELD

This disclosure generally relates to wireless communication networks, and more particularly, to a method and apparatus for random access configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE), wherein the UE is configured with multiple Bandwidth Parts (BWPs). In one embodiment, the method includes the UE receiving information from a network node to associate a RACH (Random Access Channel) configuration with a BWP among the multiple BWPs. The method further includes that the UE performing a RACH transmission in the BWP using the RACH configuration associated with the BWP.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP NR (New Radio), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.802 v14.1.0, "Study on new Radio Access Technology; Physical layer aspects (Release 14)"; TS 36.331 v14.2.0, "E-UTRA; RRC protocol specification (Release 14)"; TS 36.211 v14.3.0, "E-UTRA; Physical channels and modulation (Release 14)"; TR 38.804 v14.0.0, "Study on New Radio Access Technology; Radio Interface Protocol Aspects (Release 14)"; TS 36.304 V14.2.0, "E-UTRA; UE procedures in idle mode"; TS 36.321 V14.1.0, "E-UTRA; MAC protocol specification"; TS 36.322 V14.1.0, "E-UTRA; RLC protocol specification"; and TS 36.323 V14.1.0, "E-UTRA; PDCP protocol specification". The standards and documents listed above are hereby expressly incorporated by reference in their entirety.

Figure 1:
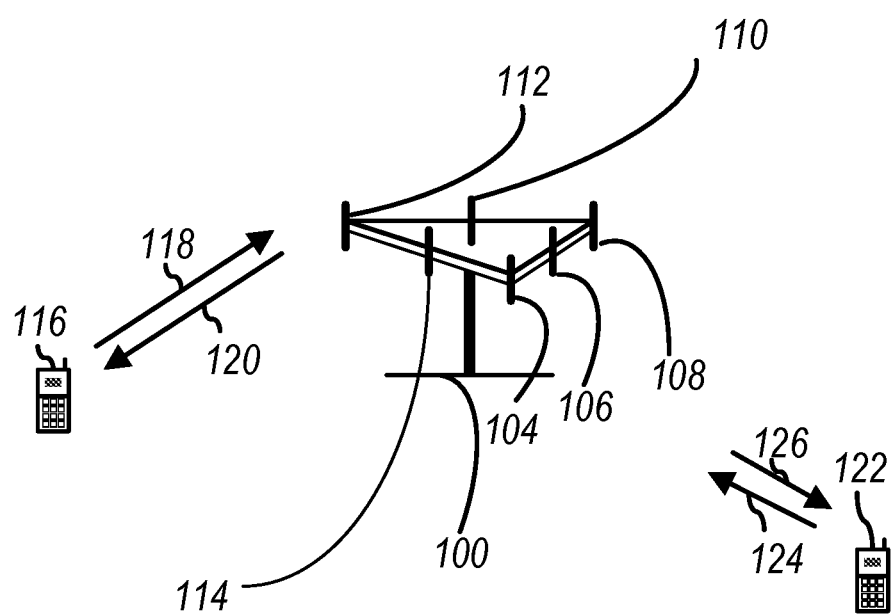
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
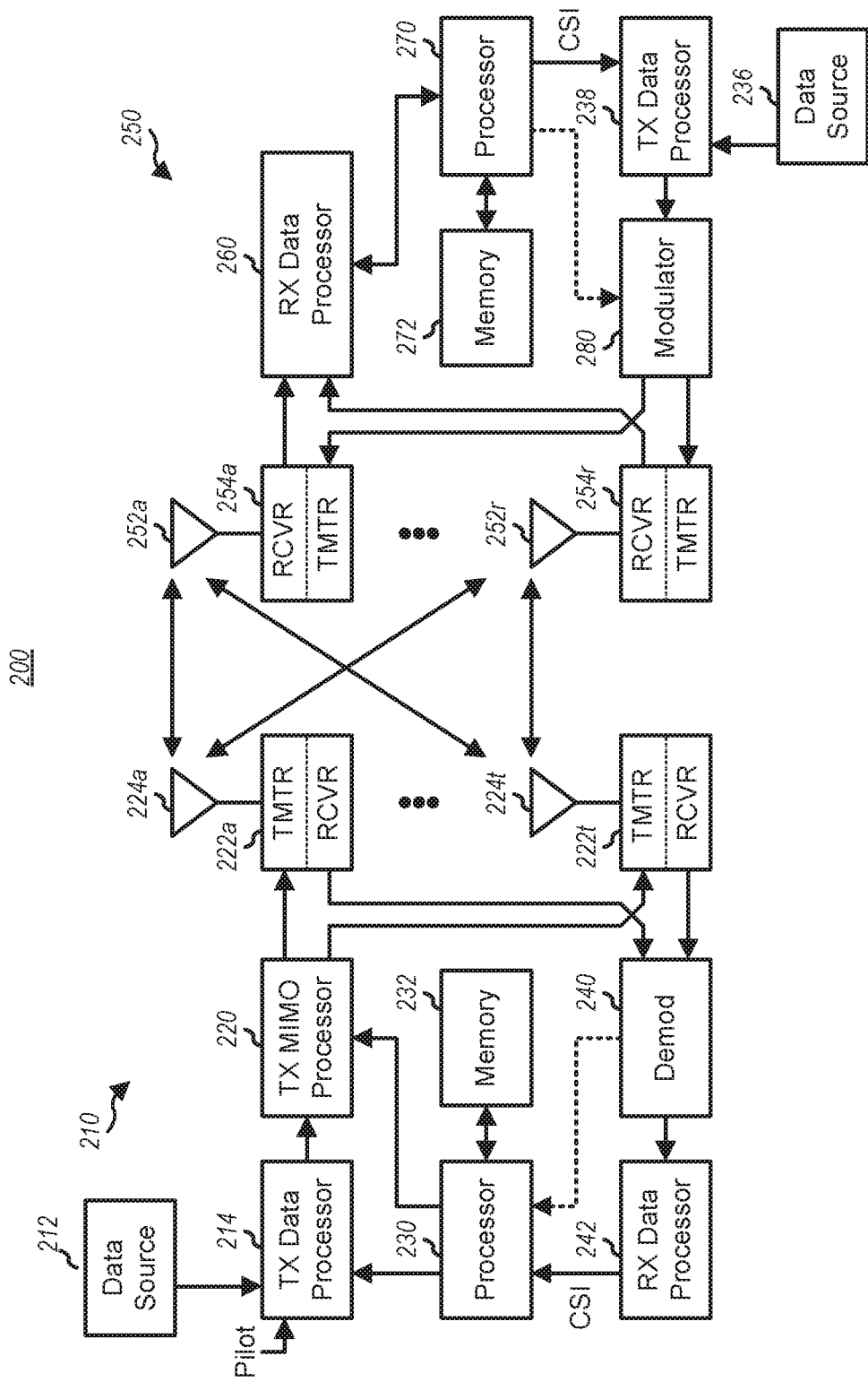
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
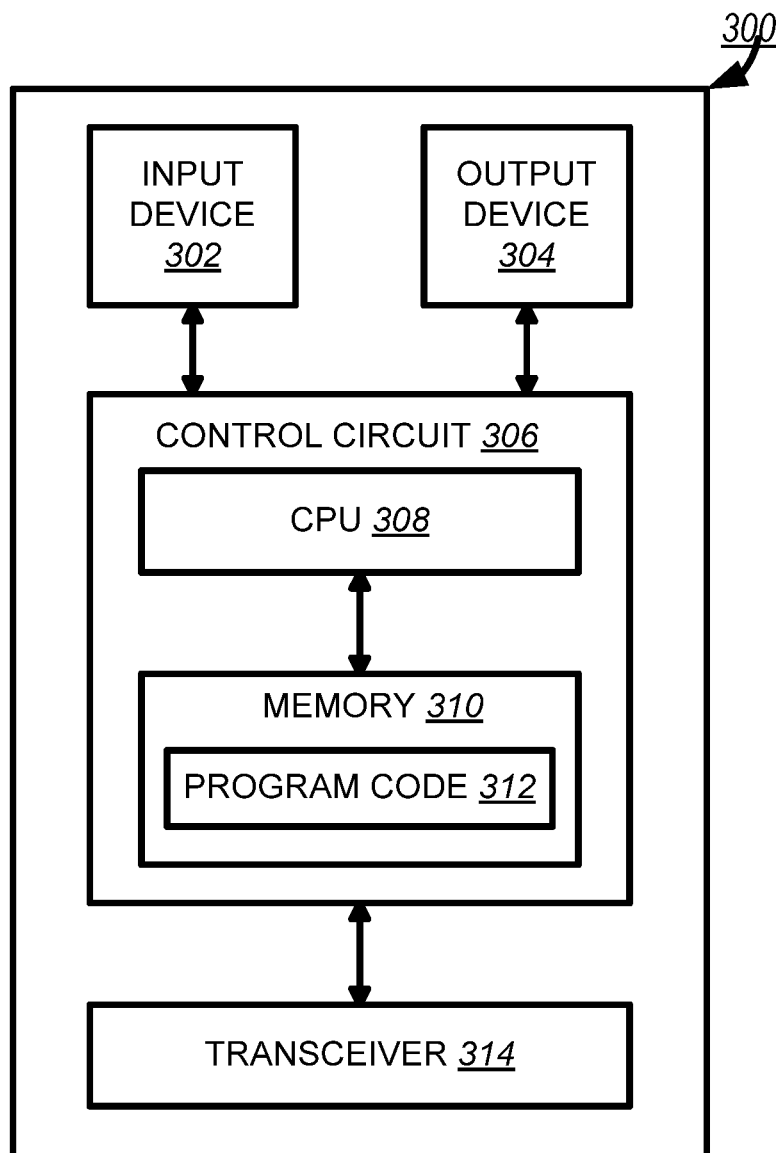
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
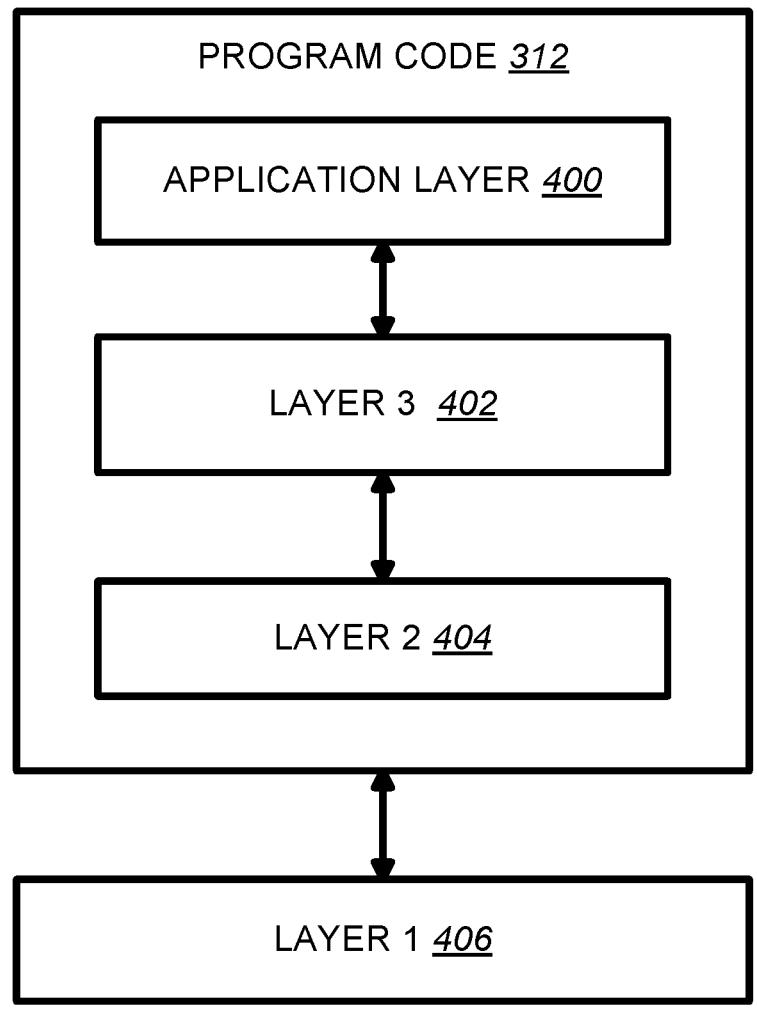
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The new radio access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)

URLLC (Ultra-Reliable and Low Latency Communications).

3GPP RAN1 has agreed to introduce the concept of bandwidth part (BWP) in NR. According to 3GPP TR 38.802, resource allocation for data transmission for a UE not capable of supporting the carrier bandwidth can be derived based on a two-step frequency-domain assignment process, i.e., indication of a bandwidth part (the 1st step) and indication of the PRBs within the bandwidth part (2nd step).

3GPP RAN1 has also reached some agreements with respect to the bandwidth part as follows:

Agreements:
  Resource allocation for data transmission for a UE not capable of supporting the carrier bandwidth can be derived based on a two-step frequency-domain assignment process
    $1^{st}$ step: indication of a bandwidth part
    $2^{nd}$ step: indication of the PRBs within the bandwidth part
    FFS definitions of bandwidth part
    FFS signaling details
  FFS the case of a UE capable of supporting the carrier bandwidth
Agreement:
  For single-carrier operation,
    UE is not required to receive any DL signals outside a frequency range A which is configured to the UE
      The interruption time needed for frequency range change from frequency range A to a frequency range B is TBD
      Frequency ranges A & B may be different in BW and center frequency in a single carrier operation
Working Assumption:
  One or multiple bandwidth part configurations for each component carrier can be semi-statically signalled to a UE
    A bandwidth part consists of a group of contiguous PRBs
      Reserved resources can be configured within the bandwidth part
    The bandwidth of a bandwidth part equals to or is smaller than the maximal bandwidth capability supported by a UE
    The bandwidth of a bandwidth part is at least as large as the SS block bandwidth
      The bandwidth part may or may not contain the SS block
    Configuration of a bandwidth part may include the following properties
      Numerology
      Frequency location (e.g. center frequency)
      Bandwidth (e.g. number of PRBs)
    Note that it is for RRC connected mode UE
    FFS how to indicate to the UE which bandwidth part configuration (if multiple) should be assumed for resource allocation at a given time
    FFS neighbour cell RR
Agreements:
  Confirm the WA of RAN1#88bis.
  Each bandwidth part is associated with a specific numerology (sub-carrier spacing, CP type)
    FFS: slot duration indication if RAN1 decides to not to downselect between 7 symbol and 14 symbols for NR slot duration
  UE expects at least one DL bandwidth part and one UL bandwidth part being active among the set of configured bandwidth parts for a given time instant.
  A UE is only assumed to receive/transmit within active DL/UL bandwidth part(s) using the associated numerology
    At least PDSCH and/or PDCCH for DL and PUCCH and/or PUSCH for UL
      FFS: down selection of combinations
  FFS if multiple bandwidth parts with same or different numerologies can be active for a UE simultaneously
    It does not imply that it is required for UE to support different numerologies at the same instance.
    FFS: TB to bandwidth part mapping
  The active DL/UL bandwidth part is not assumed to span a frequency range larger than the DL/UL bandwidth capability of the UE in a component carrier.
  Specify necessary mechanism to enable UE RF retuning for bandwidth part switching
Agreement:
  For FDD, separate sets of bandwidth part (BWP) configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
  For TDD, separate sets of BWP configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
    For UE, if different active DL and UL BWPs are configured, UE is not expected to retune the center frequency of channel BW between DL and UL
Agreement:
  At least one of configured DL BWPs includes one CORESET with common search space at least in primary component carrier
  Each configured DL BWP includes at least one CORESET with UE-specific search space for the case of single active BWP at a given time
  In case of single active BWP at a given time, if active DL BWP does not include common search space, then UE is not required to monitor the common search space
Agreement:
  In configuration of a BWP,
    A UE is configured with BWP in terms of PRBs.
      The offset between BWP and a reference point is implicitly or explicitly indicated to UE.
        FFS for reference point, e.g., center/boundary of NR carrier, channel number used for sync. and/or channel raster, or center/boundary of RMSI BW, center/boundary of SS block accessed during the initial access, etc.
  NR supports MU-MIMO between UEs in different (but overlapping) BWPs
Agreements:
  Activation/deactivation of DL and UL bandwidth parts can be
    by means of dedicated RRC signaling
      Possibility to activate in the bandwidth part configuration
    by means of DCI (explicitly and/or implicitly) or MAC CE [one to be selected]
      by means of DCI could mean
        Explicit: Indication in DCI (FFS: scheduling assignment/grant or a separate DCI) triggers activation/deactivation Separate DCI means DCI not carrying scheduling assignment/grant Implicit: Presence of DCI (scheduling assignment/grant) in itself triggers activation/deactivation This does not imply that all these alternatives are to be supported.

FFS: by means of timer

FFS: according to configured time pattern

New Radio (NR) random access procedure in physical layer is described in 3GPP TR 38.802 as follows:

8.2.1 Random Access Procedure 8.2.1.1 Preamble

NR defines that a random access preamble format consists of one or multiple random access preamble(s), a random access preamble consists of one preamble sequence plus CP, and one preamble sequence consists of one or multiple RACH OFDM symbol(s)

UE transmits PRACH according to the configured random access preamble format.

NR supports multiple RACH preamble formats, including at least RACH preamble formats with longer preamble length and shorter preamble length. Multiple/repeated RACH preambles in a RACH resource are supported. Numerology for RACH preamble can be different depending on frequency ranges. Numerology for RACH preamble can be different from or the same as that for the other UL data/control channels.

For a single RACH preamble transmission, CP/GT are required. For example, the single RACH preamble would be used when Tx/Rx beam correspondence held at both TRP and UE for multi-beam operation.

For single/multi-beam operation, the following multiple/repeated RACH preamble transmission is at least supported.

CP is inserted at the beginning of the consecutive multiple/repeated RACH OFDM symbols, CP/GT between RACH symbols is omitted and GT is reserved at the end of the consecutive multiple/repeated RACH symbols The region for PRACH transmission is aligned to the boundary of uplink symbol/slot/subframe. For supporting various coverage and forward compatibility, flexibility in the length of CP/GT and the number of repeated RACH preambles and RACH symbols is supported Note that specific use of the RACH preamble transmission may depend on RACH subcarrier spacing and TRP beam correspondence.

8.2.1.2 Procedure

RACH procedure including RACH preamble (Msg. 1), random access response (Msg. 2), message 3, and message 4 is assumed for NR from physical layer perspective. Random access procedure is supported for both IDLE mode and CONNECTED mode UEs. For 4-step RACH procedure, a RACH transmission occasion is defined as the time-frequency resource on which a PRACH message 1 is transmitted using the configured PRACH preamble format with a single particular tx beam RACH resource is also defined as a time-frequency resource to send RACH preamble. Whether UE needs to transmit one or multiple/repeated preamble within a subset of RACH resources can be informed by broadcast system information, e.g., to cover gNB RX beam sweeping in case of NO Tx/Rx beam correspondence at the gNB.

Regardless of whether Tx/Rx beam correspondence is available or not at gNB at least for multiple beams operation, the following RACH procedure is considered for at least UE in idle mode. Association between one or multiple occasions for DL broadcast channel/signal and a subset of RACH resources is informed to UE by broadcast system information or known to UE. Based on the DL measurement and the corresponding association, UE selects the subset of RACH preamble indices. UE Tx beam(s) for preamble transmission(s) is selected by the UE. During a RACH transmission occasion of single or multiple/repeated preamble(s) as informed by broadcast system information, UE uses the same UE Tx beam. NR at least supports transmission of a single Msg.1 before the end of a monitored RAR window.

At least for the case without gNB Tx/Rx beam correspondence, gNB can configure an association between DL signal/channel, and a subset of RACH resources and/or a subset of preamble indices, for determining Msg2 DL Tx beam. Based on the DL measurement and the corresponding association, UE selects the subset of RACH resources and/or the subset of RACH preamble indices. A preamble index consists of preamble sequence index and OCC index, if OCC is supported. Note that a subset of preambles can be indicated by OCC indices.

Regardless of whether Tx/Rx beam correspondence is available or not at gNB at least for multiple beams operation, at gNB, the DL Tx beam for message 2 can be obtained based on the detected RACH preamble/resource and the corresponding association. UL grant in message 2 may indicate the transmission timing of message 3. As baseline UE behavior, UE assumes single RAR reception within a given RAR window.

At least for UE in idle mode, UL Tx beam for message 3 transmission is determined by UE. UE may use the same UL Tx beam used for message 1 transmission.

Different PRACH configurations will be supported, e.g., considering different numerologies case and whether Tx/Rx beam correspondence is available or not at gNB.

For NR RACH Msg. 1 retransmission at least for multi-beam operation, NR supports power ramping. If UE doesn't change beam, the counter of power ramping keeps increasing. Note that UE may derive the uplink transmit power using the most recent estimate of path loss. Whether UE performs UL Beam switching during retransmissions is up to UE implementation. Note that which beam UE switches to is up to UE implementation.

In LTE, configurations of RACH or PRACH are specified in 3GPP TS 36.331 as follows:

PRACH-Config

The IE PRACH-ConfigSIB and IE PRACH-Config are used to specify the PRACH configuration in the system information and in the mobility control information, respectively.

PRACH-Config information elements

```
-- ASN1START
PRACH-ConfigSIB ::=          SEQUENCE {
    rootSequenceIndex            INTEGER (0..837),
    prach-ConfigInfo             PRACH-ConfigInfo
}
```

-continued

| PRACH-Config information elements |
|---|

```
PRACH-ConfigSIB-v1310 ::=            SEQUENCE {
    rsrp-ThresholdsPrachInfoList-r13         RSRP-ThresholdsPrachInfoList-r13,
    mpdcch-startSF-CSS-RA-r13                CHOICE {
        fdd-r13                                  ENUMERATED {v1, v1dot5, v2, v2dot5, v4,
v5, v8,
                                                 v10},
        tdd-r13                                  ENUMERATED {v1, v2, v4, v5, v8, v10,
v20, spare}
    }                                        OPTIONAL, -- Cond
MP
    prach-HoppingOffset-r13                  INTEGER (0..94)
OPTIONAL, -- Need OR
    prach-ParametersListCE-r13               PRACH-ParametersListCE-r13
}
PRACH-Config ::=                     SEQUENCE {
    rootSequenceIndex                        INTEGER (0..837),
    prach-ConfigInfo                         PRACH-ConfigInfo           OPTIONAL -
- Need ON
}
PRACH-Config-v1310 ::=               SEQUENCE {
    rsrp-ThresholdsPrachInfoList-r13         RSRP-ThresholdsPrachInfoList-r13
OPTIONAL, -- Cond HO
    mpdcch-startSF-CSS-RA-r13                CHOICE {
        fdd-r13                                  ENUMERATED {v1, v1dot5, v2, v2dot5, v4,
v5, v8,
                                                 v10 },
        tdd-r13                                  ENUMERATED {v1, v2, v4, v5, v8, v10,
v20, spare}
    }                                        OPTIONAL, -- Cond
MP
    prach-HoppingOffset-r13                  INTEGER (0..94)
OPTIONAL, -- Need OR
    prach-ParametersListCE-r13               PRACH-ParametersListCE-r13
OPTIONAL, -- Cond MP
    initial-CE-level-r13                     INTEGER (0..3)    OPTIONAL -- Need OR
}
PRACH-ConfigSCell-r10 ::=            SEQUENCE {
    prach-ConfigIndex-r10                    INTEGER (0..63)
}
PRACH-ConfigInfo ::=                 SEQUENCE {
    prach-ConfigIndex                        INTEGER (0..63),
    highSpeedFlag                            BOOLEAN,
    zeroCorrelationZoneConfig                INTEGER (0..15),
    prach-FreqOffset                         INTEGER (0..94)
}
PRACH-ParametersListCE-r13 ::=       SEQUENCE (SIZE(1..maxCE-Level-r13)) OF PRACH-
ParametersCE-r13
PRACH-ParametersCE-r13 ::=           SEQUENCE {
    prach-ConfigIndex-r13                    INTEGER (0..63),
    prach-FreqOffset-r13                         INTEGER (0..94),
    prach-StartingSubframe-r13                   ENUMERATED {sf2, sf4, sf8, sf16,
sf32, sf64, sf128,
                                                 sf256}      OPTIONAL, -- Need
OP
    maxNumPreambleAttemptCE-r13
                            ENUMERATED {n3, n4, n5, n6, n7, n8, n10} OPTIONAL, -
- Need OP
    numRepetitionPerPreambleAttempt-r13                ENUMERATED
{n1,n2,n4,n8,n16,n32,n64,n128},
    mpdcch-NarrowbandsToMonitor-r13          SEQUENCE (SIZE (1..2)) OF
                                             INTEGER (1..maxAvailNarrowBands-
r13),
    mpdcch-NumRepetition-RA-r13              ENUMERATED {r1, r2, r4, r8, r16,
                                                 r32, r64, r128, r256},
    prach-HoppingConfig-r13                  ENUMERATED {on,off}
}
RSRP-ThresholdsPrachInfoList-r13 ::= SEQUENCE (SIZE (1.. 3)) OF RSRP-Range
-- ASN1STOP
```

| PRACH-Config field descriptions |
|---|
| initial-CE-level |
| Indicates initial PRACH CE level at random access, see TS 36.321 [6]. If not configured, UE selects PRACH CE level based on measured RSRP level, see TS 36.321 [6]. |
| highSpeedFlag |
| Parameter: High-speed-flag, see TS 36.211 [21, 5.7.2]. TRUE corresponds to Restricted set and FALSE to Unrestricted set. |
| maxNumPreambleAttemptCE |
| Maximum number of preamble transmission attempts per CE level. See TS 36.321 [6]. |
| mpdcch-NarrowbandsToMonitor |
| Narrowbands to monitor for MPDCCH for RAR, see TS 36.213 [23, 6.2]. Field values (1..maxAvailNarrowBands-r13) correspond to narrowband indices (0..[maxAvailNarrowBands-r13-1]) as specified in TS 36.211 [21]. |
| mpdcch-NumRepetition-RA |
| Maximum number of repetitions for MPDCCH common search space (CSS) for RAR, Msg3 and Msg4, see TS 36.211 [21]. |
| mpdcch-startSF-CSS-RA |
| Starting subframe configuration for MPDCCH common search space (CSS), including RAR, Msg3 retransmission, PDSCH with contention resolution and PDSCH with RRCConnectionSetup, see TS 36.211 [21] and TS 36.213 [23]. Value v1 corresponds to 1, value v1dot5 corresponds to 1.5, and so on. |
| numRepetitionPerPreambleAttempt |
| Number of PRACH repetitions per attempt for each CE level, See TS 36.211 [21]. |
| prach-ConfigIndex |
| Parameter: prach-ConfigurationIndex, see TS 36.211 [21, 5.7.1]. |
| prach-FreqOffset |
| Parameter: prach-FrequencyOffset, see TS 36.211 [21, 5.7.1]. For TDD the value range is dependent on the value of prach-ConfigIndex. |
| prach-HoppingConfig |
| Coverage level specific frequency hopping configuration for PRACH. |
| prach-HoppingOffset |
| Parameter: PRACH frequency hopping offset, expressed as a number of resource blocks, see TS 36.211 [21, 5.7.1] |
| prach-ParametersListCE |
| Configures PRACH parameters for each CE level. The first entry in the list is the PRACH parameters of CE level 0, the second entry in the list is the PRACH parameters of CE level 1, and so on. |
| prach-StartingSubframe |
| PRACH starting subframe periodicity, expressed in number of subframes available for preamble transmission (PRACH opportunities), see TS 36.211 [21]. Value sf2 corresponds to 2 subframes, sf4 corresponds to 4 subframes and so on. EUTRAN configures the PRACH starting subframe periodicity larger than or equal to the Number of PRACH repetitions per attempt for each CE level (numRepetitionPerPreambleAttempt). |
| rootSequenceIndex |
| Parameter: RACH_ROOT_SEQUENCE, see TS 36.211 [21, 5.7.1]. |
| rsrp-ThresholdsPrachInfoList |
| The criterion for BL UEs and UEs in CE to select PRACH resource set. Up to 3 RSRP threshold values are signalled to determine the CE level for PRACH, see TS 36.213 [23]. The first element corresponds to RSRP threshold 1, the second element corresponds to RSRP threshold 2 and so on, see TS 36.321 [6]. |
| zeroCorrelationZoneConfig |
| Parameter: $N_{CS}$ configuration, see TS 36.211 [21, 5.7.2: table 5.7.2-2] for preamble format 0 . . . 3 and TS 36.211 [21, 5.7.2: table 5.7.2-3] for preamble format 4. |

| PRACH-Config field descriptions | |
|---|---|
| Conditional presence | Explanation |
| HO | The field is mandatory present if initial-CE-level-r13 is absent; otherwise it is optional, need OR. |
| MP | The field is mandatory present. |

[ . . . ]

RACH-ConfigCommon
The IE RACH-ConfigCommon is used to specify the generic
random access parameters.

| RACH-ConfigCommon information element |
|---|

```
-- ASN1START
RACH-ConfigCommon ::=                SEQUENCE {
    preambleInfo                         SEQUENCE {
        numberOfRA-Preambles                 ENUMERATED {
                                             n4, n8, n12, n16, n20, n24, n28,
                                             n32, n36, n40, n44, n48, n52, n56,
                                             n60, n64},
        preamblesGroupAConfig                SEQUENCE {
            sizeOfRA-PreamblesGroupA             ENUMERATED {
                                                 n4, n8, n12, n16, n20, n24, n28,
                                                 n32, n36, n40, n44, n48, n52, n56,
                                                 n60 },
            messageSizeGroupA                    ENUMERATED {b56, b144, b208,
b256},
            messagePowerOffsetGroupB             ENUMERATED {
                                                 minusinfinity, dB0, dB5, dB8, dB10,
dB12,
                                                 dB15, dB18},
            ...
        }        OPTIONAL                                                    -- Need OP
    },
    powerRampingParameters               PowerRampingParameters,
    ra-SupervisionInfo                   SEQUENCE {
        preambleTransMax                     PreambleTransMax,
        ra-ResponseWindowSize                ENUMERATED {
                                             sf2, sf3, sf4, sf5, sf6, sf7,
                                             sf8, sf10},
        mac-ContentionResolutionTimer        ENUMERATED {
                                             sf8, sf16, sf24, sf32, sf40, sf48,
                                             sf56, sf64}
},
    maxHARQ-Msg3Tx                       INTEGER (1..8),
    ....,
    [[ preambleTransMax-CE-r13            PreambleTransMax
OPTIONAL, -- Need OR
       rach-CE-LevelInfoList-r13          RACH-CE-LevelInfoList-r13        OPTIONAL -
- Need OR
    ]]
}
RACH-ConfigCommon-v1250 ::=          SEQUENCE {
    txFailParams-r12                     SEQUENCE {
        connEstFailCount-r12                 ENUMERATED {n1, n2, n3, n4},
        connEstFailOffsetValidity-r12        ENUMERATED {s30, s60, s120, s240,
                                             s300, s420, s600, s900},
        connEstFailOffset-r12                INTEGER (0..15)    OPTIONAL -- Need
OP
    }
}
RACH-ConfigCommonSCell-r11 ::=       SEQUENCE {
    powerRampingParameters-r11           PowerRampingParameters,
    ra-SupervisionInfo-r11               SEQUENCE {
        preambleTransMax-r11                 PreambleTransMax
    },
    ...
}
```

| RACH-ConfigCommon information element | |
|---|---|
| RACH-CE-LevelInfoList-r13 ::= | SEQUENCE (SIZE (1..maxCE-Level-r13)) OF RACH-CE-LevelInfo-r13 |
| RACH-CE-LevelInfo-r13 ::= | SEQUENCE { |
|     preambleMappingInfo-r13 |     SEQUENCE { |
|         firstPreamble-r13 |         INTEGER(0..63), |
|         lastPreamble-r13 |         INTEGER(0..63) |
|     }, | |
|     ra-ResponseWindowSize-r13 |     ENUMERATED {sf20, sf50, sf80, sf120, sf180, |
| |         sf240, sf320, sf400}, |
|     mac-ContentionResolutionTimer-r13 |     ENUMERATED {sf80, sf100, sf120, |
| |         sf160, sf200, sf240, sf480, sf960}, |
|     rar-HoppingConfig-r13 |     ENUMERATED {on,off}, |
|     ... | |
| } | |
| PowerRampingParameters ::= | SEQUENCE { |
|     powerRampingStep |     ENUMERATED {dB0, dB2,dB4, dB6}, |
|     preambleInitialReceivedTargetPower | ENUMERATED { |
| |     dBm-120, dBm-118, dBm-116, dBm-114, dBm-112, |
| |     dBm-110, dBm-108, dBm-106, dBm-104, dBm-102, |
| |     dBm-100, dBm-98, dBm-96, dBm-94, dBm-92, dBm-90} |
| } | |
| PreambleTransMax ::= | ENUMERATED { |
| |     n3, n4, n5, n6, n7,n8, n10, n20, n50, n100, n200} |
| -- ASN1STOP | |

| RACH-ConfigCommon field descriptions |
|---|
| connEstFailCount |
| Number of times that the UE detects T300 expiry on the same cell before applying connEstFailOffset. |
| connEstFailOffset |
| Parameter "$Qoffset_{temp}$" in TS 36.304 [4]. If the field is not present the value of infinity shall be used for "$Qoffset_{temp}$". |
| connEstFailOffset Validity |
| Amount of time that the UE applies connEstFailOffset before removing the offset from evaluation of the cell. Value s30 corresponds to 30 seconds, s60 corresponds to 60 seconds, and so on. |
| mac-ContentionResolutionTimer |
| Timer for contention resolution in TS 36.321 [6]. Value in subframes. Value sf8 corresponds to 8 subframes, sf16 corresponds to 16 subframes and so on. |
| maxHARQ-Msg3Tx |
| Maximum number of Msg3 HARQ transmissions in TS 36.321 [6], used for contention based random access. Value is an integer. |
| messagePowerOffsetGroupB |
| Threshold for preamble selection in TS 36.321 [6]. Value in dB. Value minusinfinity corresponds to -infinity. Value dB0 corresponds to 0 dB, dB5 corresponds to 5 dB and so on. |
| messageSizeGroupA |
| Threshold for preamble selection in TS 36.321 [6]. Value in bits. Value b56 corresponds to 56 bits, b144 corresponds to 144 bits and so on. |
| numberOfRA-Preambles |
| Number of non-dedicated random access preambles in TS 36.321 [6]. Value is an integer. Value n4 corresponds to 4, n8 corresponds to 8 and so on. |
| connEstFailCount |
| Number of times that the UE detects T300 expiry on the same cell before applying connEstFailOffset. |
| powerRampingStep |
| Power ramping factor in TS 36.321 [6]. Value in dB. Value dB0 corresponds to 0 dB, dB2 corresponds to 2 dB and so on. |

| RACH-ConfigCommon field descriptions |
| --- |
| preambleInitialReceivedTargetPower |
| Initial preamble power in TS 36.321 [6]. Value in dBm. Value dBm-120 corresponds to −120 dBm, dBm-118 corresponds to −118 dBm and so on.<br>preambleMappingInfo |
| Provides the mapping of premables to groups for each CE level, as specified in TS 36.321 [6].<br>preamblesGroupAConfig |
| Provides the configuration for preamble grouping in TS 36.321 [6]. If the field is not signalled, the size of the random access preambles group A [6] is equal to numberOfRA-Preambles.<br>preambleTransMax, preambleTransMax-CE |
| Maximum number of preamble transmission in TS 36.321 [6]. Value is an integer. Value n3 corresponds to 3, n4 corresponds to 4 and so on.<br>rach-CE-LevelInfoList |
| Provides RACH information each coverage level. The first entry in the list is the contention resolution timer of CE level 0, the second entry in the list is the contention resolution timer of CE level 1, and so on. If E-UTRAN includes rach-CE-LevelInfoList, it includes the same number of entries as in prach-ParametersListCE.<br>ra-ResponseWindowSize |
| Duration of the RA response window in TS 36.321 [6]. Value in subframes. Value sf2 corresponds to 2 subframes, sf3 corresponds to 3 subframes and so on. The same value applies for each serving cell (although the associated functionality is performed independently for each cell).<br>connEstFailCount |
| Number of times that the UE detects T300 expiry on the same cell before applying connEstFailOffset.<br>rar-HoppingConfig |
| Frequency hopping activation/deactivation for RAR/Msg3/Msg4 for a CE level, see TS 36.211 [21].<br>sizeOfRA-PreamblesGroupA |
| Size of the random access preambles group A in TS 36.321 [6]. Value is an integer. Value n4 corresponds to 4, n8 corresponds to 8 and so on. |

In LTE, a transmission on PRACH is specified in 3GPP TS 36.211.

Based on the current agreement for bandwidth part in NR mentioned above, a UE is only assumed to receive or transmit within active DL (Downlink) or UL (Uplink) bandwidth part(s) using the associated numerology, at least PDSCH (Physical Downlink Shared Channel) and/or PDCCH (Physical Downlink Control Channel) for DL and PUCCH and/or PUSCH for UL. It has also been agreed that numerology for RACH (Random Access Channel) preamble can be different from or the same as that for the other UL data/control channels.

In general, to perform a RACH transmission, a UE needs to select an available RACH resource (or a RACH opportunity) based on RACH configuration(s). In addition, a UE may be configured with one or multiple bandwidth parts (BWPs) and one of BWPs may be active (or activated). It may also be possible that multiple BWPs are active (or activated). One BWP is associated with a specific numerology. Different BWPs may associate with the same or different numerologies. RACH resources (or opportunities) may or may not be available in the currently active BWP of the UE.

Performing a RACH transmission (or selecting a RACH resource or opportunity) outside the currently active BWP requires RF (Radio Frequency) retuning and causes interruption. The UE generally needs to retune its RF from the currently active BWP to the frequency of the selected RACH resource or opportunity before performing the RACH transmission. During the RF retuning, the UE is not able to perform a transmission or a reception. Interruption is thus caused due to RF retuning. The interruption can last for a period of time, e.g. tens of micro-seconds to hundreds of micro-seconds. The interruption may be inevitable if there is no RACH resources or opportunities that can be used by the UE in the currently active BWP. However, to avoid the interruption, if there is a RACH resource or opportunity that can be used by the UE in the currently active BWP, it may be preferable for the UE to perform a RACH transmission in the currently active BWP. It seems simpler and efficient.

A UE should perform a RACH transmission (or select a RACH resource or opportunity) in an active BWP if there is a RACH resource or opportunity that can be used by the UE in an active BWP. There may be a RACH resource or opportunity that can be used by the UE outside the active BWP, e.g. in a BWP which is not currently active. The UE may not perform a RACH transmission (or select a RACH resource or opportunity) outside the active BWP (e.g. in a BWP which is not currently active) if there is a RACH resource/opportunity that can be used by the UE in the active BWP. The UE may perform a RACH transmission (or select a RACH resource or opportunity) outside the active BWP (e.g. in a BWP which is not currently active) if there is no RACH resource or opportunity that can be used by the UE in the active BWP. The UE may prioritize (or prefer) a RACH resource or opportunity in the active BWP. The UE may de-prioritize a RACH resource or opportunity outside the active BWP. The UE may select a RACH resource or opportunity when there is a need to perform a RACH transmission.

It has been agreed that different PRACH configurations will be supported, e.g. considering different numerologies case and whether Tx/Rx beam correspondence is available or not at gNB. Generally, at least some RACH configuration should be common to all UEs of a cell, e.g. RACH-ConfigCommon or PRACH-config in LTE (see 3GPP TS 36.331 v14.2.0 for more detail). The RACH configuration(s) can be provided by system information. The BWP configuration and activation/deactivation of a BWP is dedicated to a UE. When a UE needs to perform a RACH transmission, it may need to select a RACH resource or opportunity that is usable (or preferable) by the UE. For example, a RACH resource or opportunity in the currently active BWP may be considered as usable or preferable to the UE. However, the UE may not select a RACH resource or opportunity properly if the UE does not know whether a RACH resource or opportunity is in the currently active BWP of the UE.

To solve the problem, the UE needs to know which RACH configuration is associated with the currently active BWP. There should be an association between a RACH configuration and a BWP, and the association of the RACH configuration and the BWP should be provided to the UE. The concept of the invention is that a UE is provided with information to associate a RACH configuration with a BWP. The UE performs a RACH transmission (or selects a RACH resource or opportunity) based on the information and/or the currently active BWP of the UE.

In one embodiment, the information may be a frequency information. The frequency information can be used by a UE to associate a BWP with a RACH configuration. The BWP may be an active BWP of the UE. The frequency information may be included in a RACH configuration. The frequency information may indicate or derive a frequency (e.g. physical resource block (PRB)). The UE may determine that a RACH configuration is associated with the currently active BWP if the frequency information indicating (or deriving) a frequency within the currently active BWP. The UE may determine that a RACH configuration is not associated with the currently active BWP if the frequency information indicating (or deriving) a frequency outside the currently active BWP.

The frequency information may be used to indicate or derive a frequency (e.g. physical resource block (PRB)) of one or more RACH resources or opportunities. The UE may determine whether a RACH resource or opportunity is in the currently active BWP based on the frequency information. For example, if the indicated (or derived) frequency is within the frequency range of the currently active BWP, the UE considers the associated RACH resource or opportunity is in the currently active BWP. If the indicated (or derived) frequency is not within the frequency range of the currently active BWP, the UE considers the associated RACH resource or opportunity is outside the currently active BWP.

Figure 5:
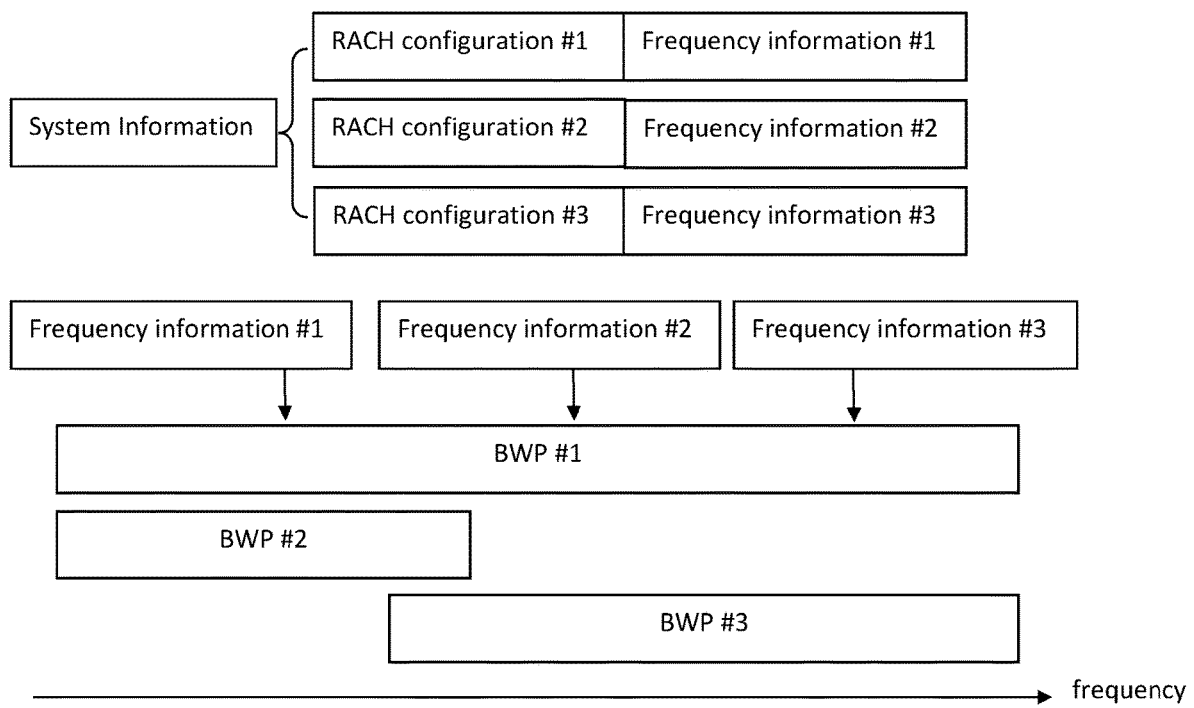
FIG. 5 is a diagram according to one exemplary embodiment.

An example of associating a RACH configuration with a BWP by frequency information is illustrated in FIG. 5. In this example, system information provides 3 RACH configurations (RACH configuration #1 to #3), and each RACH configuration includes frequency information (frequency information #1 to #3, respectively). The frequency information indicates a frequency location of its corresponding RACH configuration. A UE is configured with 3 BWPs (BWP #1 to #3). Based on the BWP configuration of the UE, frequency information #1 is in BWP#1 and BWP#2, frequency information #2 is in BWP#1 and BWP#3, and frequency information #3 is in BWP#1 and BWP #3. Then, when BWP#1 is active, the UE can use RACH configuration #1, #2, and #3 (since BWP#1 covers frequency information #1, #2, and #3). When BWP#2 is active, the UE can use RACH configuration #1. When BWP #3 is active, the UE can use RACH configuration #2 and #3. Moreover, when no BWP covering a frequency information is active, the UE does not use a RACH configuration corresponding to the frequency information (at least when there is other RACH configuration that can be used).

The information may be an index (or an identity) of a RACH configuration. The index (or the identity) can be used to identify a RACH configuration. The index (or the identity) may be included in system information. Alternatively, the index (or the identity) may be implicitly indicated, and not explicitly included in the system information. For example, the index (or the identity) is indicated by the structure (or the order) of the RACH configurations included in the system information e.g. the first RACH configuration (i.e. RACH configuration #1 in FIG. 6) is associated with index 1 and the second RACH configuration (i.e. RACH configuration #2 in FIG. 6) is associated with index 2, and so on.

A BWP configuration can include the index (or the identity) of the RACH configuration and associating a BWP with the RACH configuration. The UE may consider a RACH configuration as usable/preferable if a BWP associated with the RACH configuration is active. For example, when a BWP is activated, the UE considers the RACH configuration associated with the BWP as usable or preferable. When a BWP is deactivated, the UE considers the RACH configuration associated with the BWP as not usable or preferable.

In one embodiment, the information may be provided in system information. The information may be included in (or provided along with) a RACH configuration. The information may be included in (or provided along with) a BWP configuration. The UE may be configured with more than one BWPs. One of the configured BWPs may be currently active (or activated). More than one of the configured BWPs may be currently active (or activated). There may be RACH resources available on more than one BWPs configured to the UE. The UE may be provided with multiple RACH configurations. The information is included in each RACH configuration. Each RACH configuration is associated with one information. Each RACH configuration is associated with one BWP.

Figure 6:
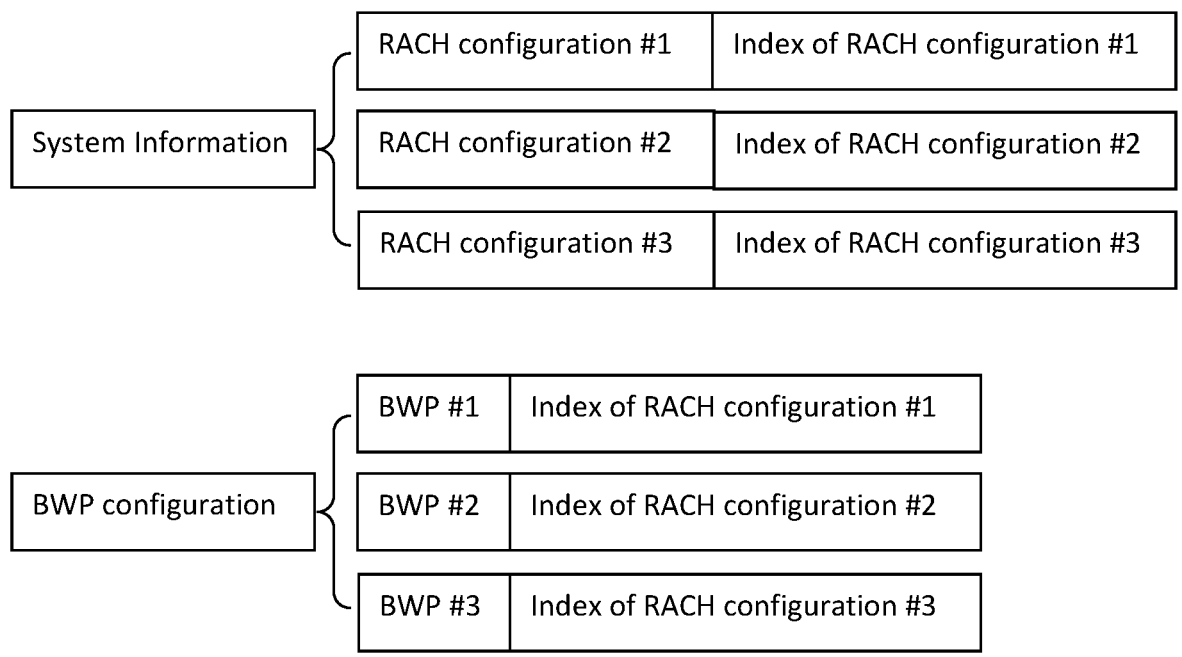
FIG. 6 is a diagram according to one exemplary embodiment.

An example of associating a RACH configuration with a BWP by index information is illustrated in FIG. 6. In this example, system information provides 3 RACH configurations (RACH configuration #1 to #3), and each RACH configuration includes index information (index #1 to #3, respectively). The index information identifies a RACH configuration. A UE is configured with 3 BWPs (BWP #1 to #3). In the BWP configuration, each BWP is associated with one index of RACH configuration. It may also be possible that a BWP is associated with more than one index. When a BWP is active, the UE can use the RACH configuration(s) associated with the BWP indicated in the BWP configuration. For example, when BWP #1 is active, the UE can use RACH configuration #1. When BWP#2 is active, the UE can use RACH configuration #2. When BWP #3 is active, the UE can use RACH configuration #3. The RACH configuration not associated with the currently active BWP should not be used (at least when there is RACH configuration that can be used).

In one embodiment, a RACH transmission may be a transmission on PRACH, a transmission of RA preamble, and/or a transmission during a RA (Random Access) procedure. A RACH configuration may be a PRACH configuration, a configuration related to RACH. A RACH resource may be a time and/or frequency resource for a RACH transmission. A RACH opportunity may be an opportunity on time and/or frequency domain that can be used by the UE for a RACH transmission.

Figure 7:
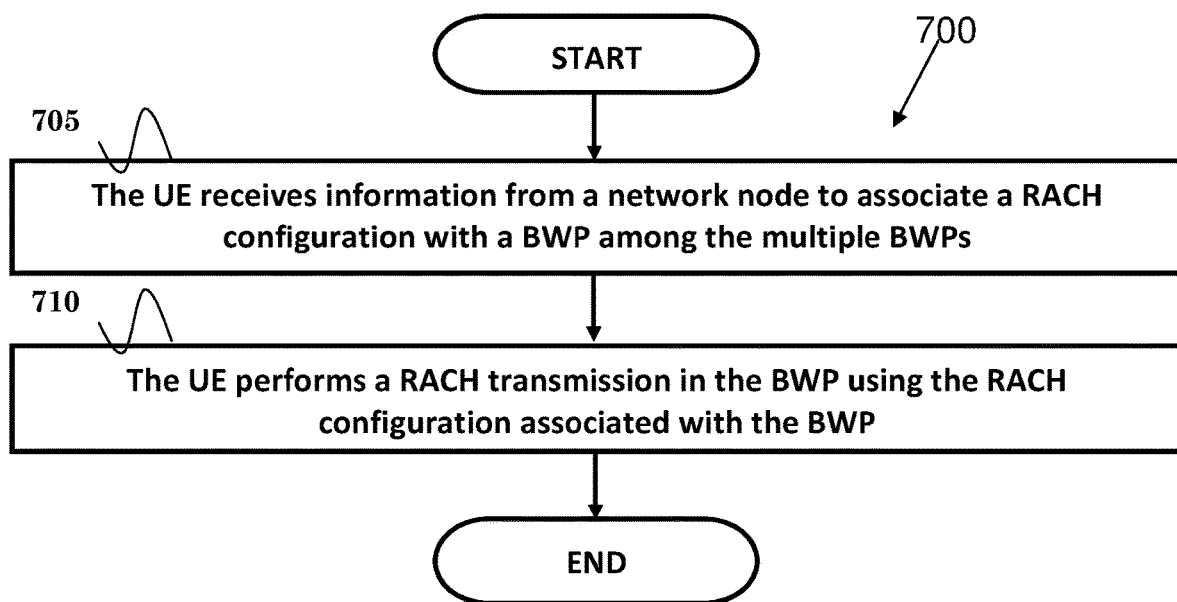
FIG. 7 is a flow chart according to one exemplary embodiment.

FIG. 7 is a flow chart 700 according to one exemplary embodiment of a UE. In step 705, the UE receives information from a network node to associate a RACH configuration with a BWP among the multiple BWPs. In step 710, the UE performs a RACH transmission in the BWP using the RACH configuration associated with the BWP.

In one embodiment, the UE could determine the RACH configuration is associated with the BWP if the information is included in a configuration of the BWP. The information could identify the RACH configuration and the information is included in a BWP configuration.

In one embodiment, the UE could be configured with multiple RACH configurations. Each RACH configuration could be associated with one BWP among the multiple BWPs.

In one embodiment, the UE could perform an UL (Uplink) transmission on a PUSCH (Physical Uplink Shared Channel) in the BWP. More specifically, the UE could perform the UL transmission on the PUSCH in the BWP if a DCI (Downlink Control Information) indicates a scheduling grant is received.

In one embodiment, the UE could receive a signalling from the network node to activate the BWP. The signalling could be a Radio Resource Control (RRC) signalling, a Downlink Control Information (DCI) indicating a scheduling grant, or a MAC (Medium Access Control) control element. The BWP could be a UL BWP. The RACH transmission could be a transmission of a random access preamble.

Referring back to FIGS. 3 and 4, in one exemplary embodiment of a UE, the device 300 includes a program code 312 stored in the memory 310. The CPU 308 could execute program code 312 to enable the UE (i) to receive information from a network node to associate a RACH configuration with a BWP among the multiple BWPs, and (ii) to perform a RACH transmission in the BWP using the RACH configuration associated with the BWP. Furthermore, the CPU 308 can execute the program code 312 to perform all of the above-described actions and steps or others described herein.

Figure 8:
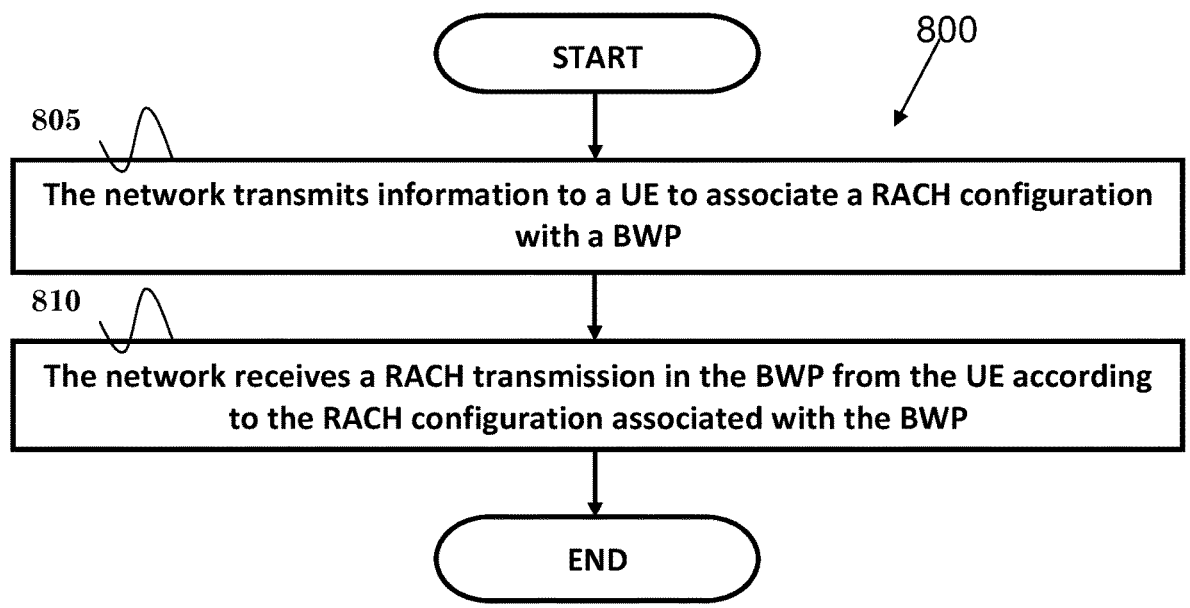
FIG. 8 is a flow chart according to one exemplary embodiment.

FIG. 8 is a flow chart 800 according to one exemplary embodiment of a network node. In step 805, the network node transmits information to a UE to associate a RACH configuration with a BWP. In step 810, the network node receives a RACH transmission in the BWP from the UE according to the RACH configuration associated with the BWP.

In one embodiment, the UE could be configured with multiple BWPs and the BWP is among the multiple BWPs. The network node could transmit a signalling to the UE to activate the BWP.

In one embodiment, the UE could receive a signalling from the network node to activate the BWP. The signalling could be a RRC signalling, a DCI indicating a scheduling grant, or a MAC control element. The BWP could be a UL (Uplink) BWP. The RACH transmission could be a transmission of a random access preamble.

Referring back to FIGS. 3 and 4, in one exemplary embodiment of a network node, the device 300 includes a program code 312 stored in the memory 310. The CPU 308 could execute program code 312 to enable the network node (i) to transmit information to a UE to associate a RACH configuration with a BWP, and (ii) to receive a RACH transmission in the BWP from the UE according to the RACH configuration associated with the BWP. Furthermore, the CPU 308 can execute the program code 312 to perform all of the above-described actions and steps or others described herein.

Figure 9:
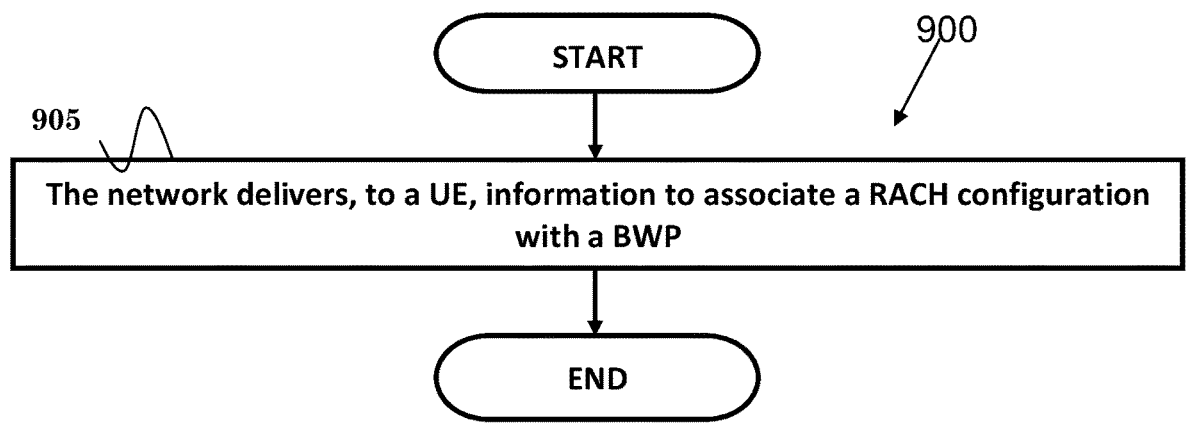
FIG. 9 is a flow chart according to one exemplary embodiment.

FIG. 9 is a flow chart 900 according to one exemplary embodiment of a network node. In step 905, the network transmits, to a UE, information to associate a RACH configuration with a BWP.

Referring back to FIGS. 3 and 4, in one exemplary embodiment of a network, the device 300 includes a program code 312 stored in the memory 310. The CPU 308 could execute program code 312 to enable the network to transmit, to a UE, information to associate a RACH configuration with a BWP. Furthermore, the CPU 308 can execute the program code 312 to perform all of the above-described actions and steps or others described herein.

Figure 10:
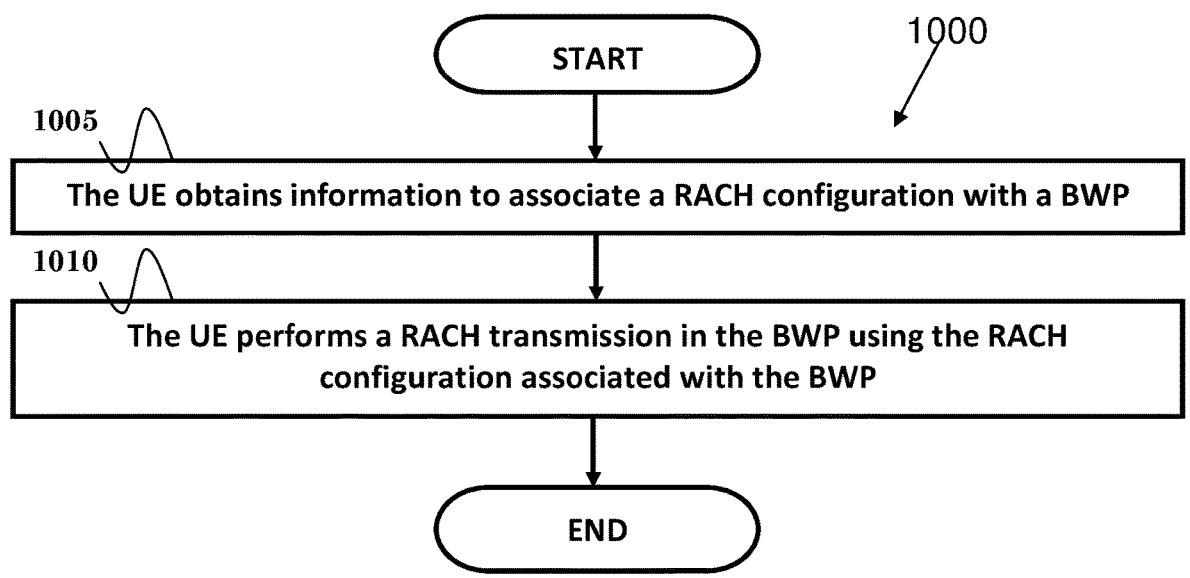
FIG. 10 is a flow chart according to one exemplary embodiment.

FIG. 10 is a flow chart 1000 according to one exemplary embodiment of a UE. In step 1005, the UE obtains information to associate a RACH configuration with a BWP. In one embodiment, the BWP could be an active BWP of the UE.

In step 1010, the UE performs a RACH transmission in the BWP using the RACH configuration associated with the BWP. In one embodiment, the UE could determine whether the RACH configuration is associated with an active BWP of the UE based on the information.

In one embodiment, the UE could select a RACH resource for the RACH transmission based on the information, e.g. selecting the RACH resource associated with an active BWP of the UE. Alternatively or additionally, the UE could select a RACH opportunity for the RACH transmission based on the information, e.g. selecting the RACH opportunity associated with an active BWP of the UE.

In one embodiment, the UE could prioritize a RACH configuration, a RACH resource, or a RACH opportunity associated with an active BWP of the UE for the RACH transmission.

Referring back to FIGS. 3 and 4, in one exemplary embodiment of a UE, the device 300 includes a program code 312 stored in the memory 310. The CPU 308 could execute program code 312 to enable the UE (i) to obtain information to associate a RACH configuration with a BWP, and (ii) to perform a RACH transmission in the BWP using the RACH configuration associated with the BWP. Furthermore, the CPU 308 can execute the program code 312 to perform all of the above-described actions and steps or others described herein.

In one embodiment, the information could include frequency information. Alternatively or additionally, the information could be included in the RACH configuration. Alternatively or additionally, the information could indicate or derive a frequency, e.g. physical resource block.

In one embodiment, the UE could associate a RACH configuration with a BWP if the information for the RACH configuration indicating a frequency within the BWP. The UE could determine the RACH configuration is associated with an active BWP if the frequency is within the active BWP. The UE could determine the RACH configuration is not associated with an active BWP if the frequency is outside the active BWP.

In one embodiment, the information could include an index (or an identity) of a RACH configuration. The information could identify a RACH configuration. The information could be included in a BWP configuration.

In one embodiment, the UE could associate a RACH configuration with a BWP if the information for the RACH configuration is included in a configuration of the BWP. The UE could determine the RACH configuration is associated with an active BWP if the information is included in a configuration of an active BWP. The UE could determine the RACH configuration is not associated with an active BWP if the information is not included in a configuration of an active BWP.

In one embodiment, the information could be included in system information. The information could be implicitly indicated by the RACH configuration. The information could be implicitly indicated by sequence of the RACH configuration included in system information.

In one embodiment, the UE could obtain the information by receiving the information, or by deriving the information from system information. The UE could be configured with more than one BWPs.

In one embodiment, at least one of the configured BWPs is active. The RACH resources are available on more than one configured BWPs. The UE could be provided with more than one RACH configurations.

In one embodiment, each RACH configuration could include the information. Each RACH configuration could be associated with a BWP.

In one embodiment, the RACH transmission could be a transmission on a PRACH (Physical Random Access Channel), a transmission of RA (Random Access) preamble, or a transmission during a RA procedure. The RACH configuration could include a configuration of a PRACH. The RACH configuration could include a configuration related to a RACH (Random Access Channel). The RACH resource could include a time and/or frequency resource for a RACH transmission. The RACH opportunity could include an opportunity on time and/or frequency domain that can be used by the UE for a RACH transmission.

In one embodiment, the BWP could be a UL BWP and/or DL BWP. The BWP could indicate a bandwidth for transmission and/or reception. The BWP configuration could include a bandwidth, e.g. number of PRBs. The BWP configuration could also include a frequency location, e.g. center frequency. Furthermore, the BWP configuration could include a numerology.

In one embodiment, the active BWP could be a BWP configured to the UE which is activated. The BWP could be activated or deactivated, e.g. via a network signaling.

In one embodiment, the UE may not be required to perform a transmission and/or reception outside its active BWP(s). Furthermore, the UE could be in a connected mode. The network node could be a NR gNB.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), wherein the UE is configured with multiple Bandwidth Parts (BWPs) in one component carrier, comprising:
    receiving information from a network node to associate a first RACH (Random Access Channel) configuration with a first BWP for at least one of the multiple BWPs of the one component carrier;
    determining whether there is a second RACH configuration associated with a currently active BWP after receiving the information;
    selecting a RACH resource to perform a RACH transmission in the currently active BWP using the second RACH configuration if the second RACH configuration is associated with the currently active BWP; and
    selecting a RACH resource to perform a RACH transmission in a second BWP which is not the currently active BWP if no RACH configuration is associated with the currently active BWP.

2. The method of claim 1, wherein the UE determines the second RACH configuration is associated with the currently active BWP if the second RACH configuration is included in a configuration of the currently active BWP.

3. The method of claim 1, wherein the information identifies the first RACH configuration.

4. The method of claim 1, wherein each RACH configuration is associated with one BWP among the multiple BWPs.

5. The method of claim 1, wherein the UE is configured with multiple RACH configurations.

6. The method of claim 1, wherein the UE performs an UL (Uplink) transmission on a PUSCH (Physical Uplink Shared Channel) in the currently active BWP.

7. The method of claim 1, further comprising:
    the UE receives a signalling from the network node to activate a BWP.

8. The method of claim 1, wherein the RACH transmission is a transmission of a random access preamble.

9. A method for a network node, comprising:
    transmitting information to a User Equipment (UE) to associate a first Random Access Channel (RACH) configuration with a first Bandwidth Part (BWP) for at least one of multiple BWPs in one component carrier;
    receiving a RACH transmission in a currently active BWP from the UE according to a second RACH configuration if the second RACH configuration is associated with the currently active BWP; and
    receiving a RACH transmission in a second BWP which is not the currently active BWP if no RACH configuration is associated with the currently active BWP,
    wherein the UE determines whether there is the second RACH configuration associated with the currently active BWP after receiving the information.

10. The method of claim 9, wherein the UE is configured with the multiple BWPs in the one component carrier and the BWP is among the multiple BWPs.

11. The method of claim 9, further comprising:
    the network node transmits a signalling to the UE to activate a BWP.

12. The method of claim 11, wherein the signalling is a Radio Resource Control (RRC) signalling, a Downlink Control Information (DCI) indicating a scheduling grant, or a MAC (Medium Access Control) control element.

13. A User Equipment (UE), wherein the UE is configured with multiple Bandwidth Parts (BWPs) in one component carrier, comprising:
    a control circuit;
    a processor installed in the control circuit; and
    a memory installed in the control circuit and operatively coupled to the processor;
    wherein the processor is configured to execute a program code stored in the memory to:
    receive information from a network node to associate a first RACH (Random Access Channel) configuration with a first BWP for at least one of the multiple BWPs of the one component carrier;
    determine whether there is a second RACH configuration associated with a currently active BWP after receiving the information;
    select a RACH resource to perform a RACH transmission in the currently active BWP using the second RACH configuration if the second RACH configuration is associated with the currently active BWP; and
    select a RACH resource to perform a RACH transmission in a second BWP which is not the currently active BWP if no RACH configuration is associated with the currently active BWP.

14. The UE of claim 13, wherein the UE determines the second RACH configuration is associated with the currently active BWP if the information is included in a configuration of the currently active BWP.

15. The UE of claim 13, wherein the information identifies the first RACH configuration.

16. The UE of claim 13, wherein each RACH configuration is associated with one BWP among the multiple BWPs.

17. The UE of claim 13, wherein the UE is configured with multiple RACH configurations.

18. The UE of claim 13, wherein the UE performs an UL (Uplink) transmission on a PUSCH (Physical Uplink Shared Channel) in the currently active BWP.

19. The UE of claim 13, further comprising:
the UE receives a signalling from the network node to activate a BWP.

20. The UE of claim 13, wherein the RACH transmission is a transmission of a random access preamble.

21. A network node, comprising:
a control circuit;
a processor installed in the control circuit; and
a memory installed in the control circuit and operatively coupled to the processor;
wherein the processor is configured to execute a program code stored in the memory to:
transmit information to a User Equipment (UE) to associate a first Random Access Channel (RACH) configuration with a first Bandwidth Part (BWP) for at least one of multiple BWPs in one component carrier;
receive a RACH transmission in a currently active BWP from the UE according to a second RACH configuration if the second RACH configuration is associated with the currently active BWP; and
receive a RACH transmission in a second BWP which is not the currently active BWP if no RACH configuration is associated with the currently active BWP,
wherein the UE determines whether there is the second RACH configuration associated with the currently active BWP after receiving the information.

22. The network node of claim 21, wherein the UE is configured with the multiple BWPs in the one component carrier and the BWP is among the multiple BWPs.

23. The network node of claim 21, further comprising:
the network node transmits a signalling to the UE to activate a BWP.

24. The network node of claim 23, wherein the signalling is a Radio Resource Control (RRC) signalling, a Downlink Control Information (DCI) indicating a scheduling grant, or a MAC (Medium Access Control) control element.

* * * * *